United States Patent [19]

Vu et al.

[11] Patent Number: 4,855,878

[45] Date of Patent: Aug. 8, 1989

[54] BACK UP SIDE FENDER LIGHT

[76] Inventors: Thaun D. Vu, 323 18 St., Brooklyn, N.Y. 11215; George Spector, 233 Broadway, Rm. 3815, New York, N.Y. 10007

[21] Appl. No.: 267,240

[22] Filed: Nov. 4, 1988

[51] Int. Cl.[4] .............................. B60Q 1/08; B60Q 1/22
[52] U.S. Cl. ........................................ 362/66; 362/65; 362/83; 362/287; 362/802
[58] Field of Search ..................... 362/61, 65, 66, 83, 362/802, 285, 287, 288; 340/52 R, 70, 87, 91, 100

[56] References Cited

U.S. PATENT DOCUMENTS

| 1,698,767 | 1/1929 | Moore ................................ 340/91 |
| 1,965,916 | 7/1934 | Wise ................................... 362/61 |
| 2,084,245 | 6/1937 | Irujo .................................. 362/83 |
| 2,278,567 | 4/1942 | Schuermans et al. ............. 362/80 |
| 2,785,772 | 6/1957 | Habsburg-Lothringen et al. ..................................... 362/83 |
| 3,526,764 | 9/1970 | Klie et al. ......................... 362/65 |
| 4,049,309 | 9/1977 | Seal .................................... 362/65 |
| 4,152,694 | 5/1979 | Toles .................................. 362/83 |

FOREIGN PATENT DOCUMENTS 535894 8/1956 Fed. Rep. of Germany ........ 362/83

*Primary Examiner*—Ira S. Lazarus
*Assistant Examiner*—Richard R. Cole

[57] ABSTRACT

An auxiliary backup side fender light for a motor vehicle is provided and consists of a stationary housing mounted within side of a front fender of the motor vehicle. A movable housing that has a reflective chamber is spring biased to forward end of the stationary housing so as to extend therein while an auxiliary lamp is mounted into the reflective chamber. A mechanism is for pivoting the movable housing out from the stationary housing so that the auxiliary lamp can be activated to project light beams rearwardly to help a driver see at night when parking.

3 Claims, 1 Drawing Sheet

U.S. Patent   Aug. 8, 1989   4,855,878
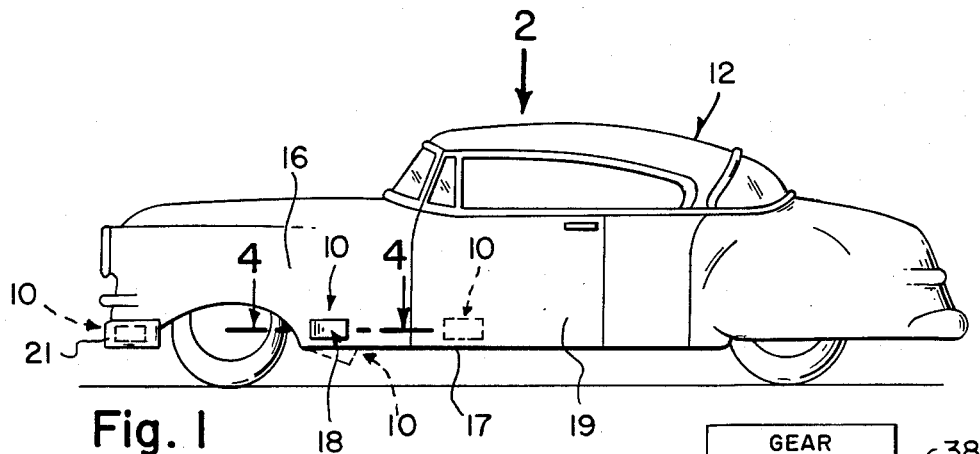
Fig. 1
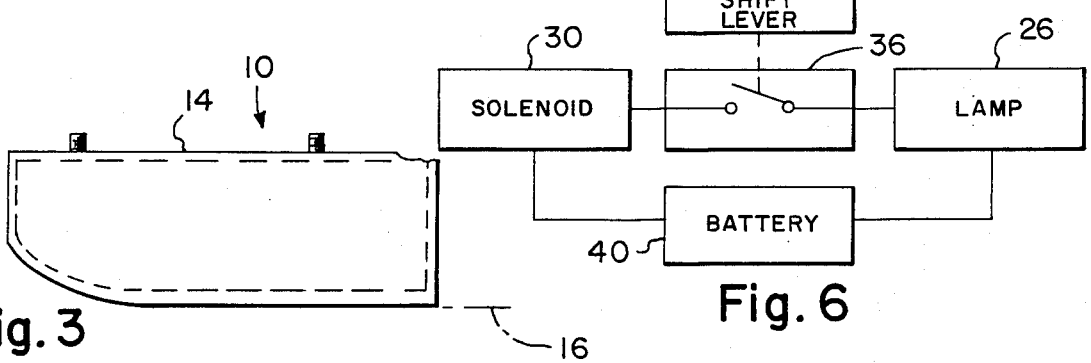
Fig. 3
Fig. 6
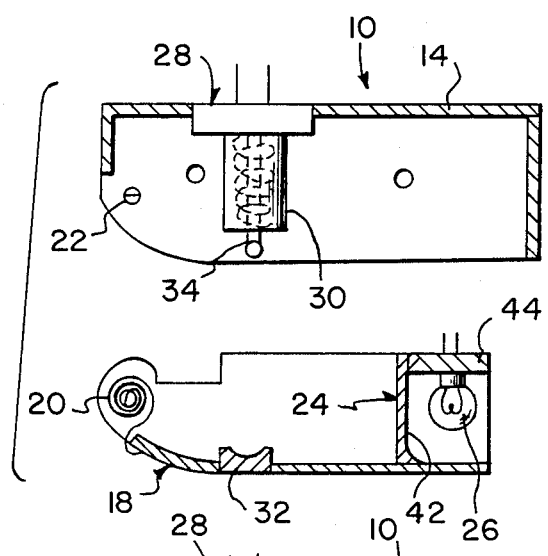
Fig. 4
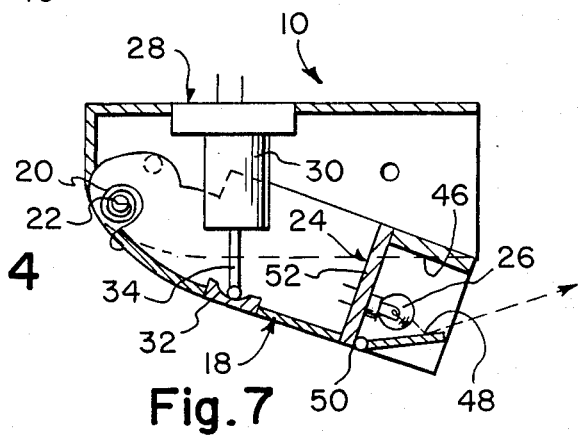
Fig. 7
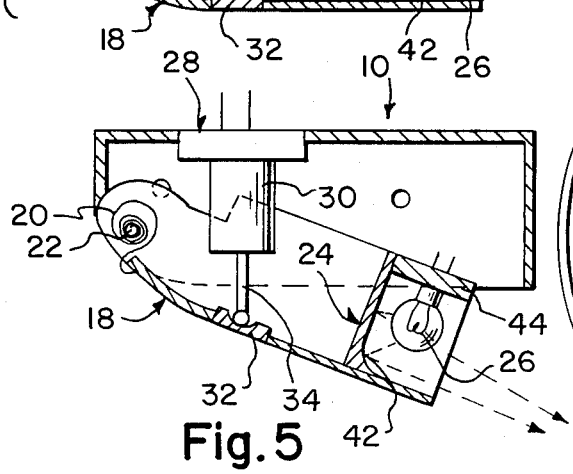
Fig. 5
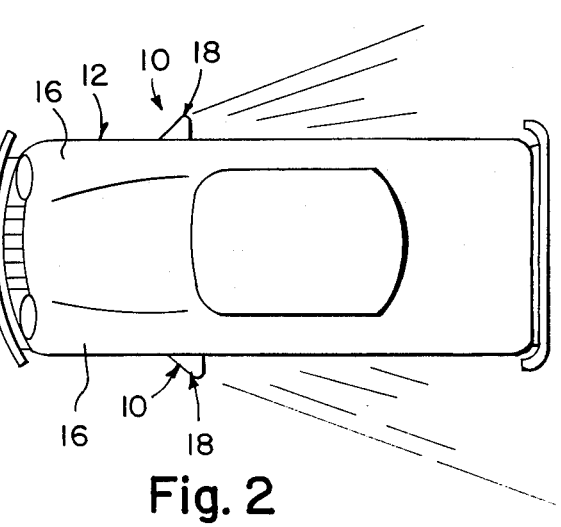
Fig. 2

BACK UP SIDE FENDER LIGHT

BACKGROUND OF THE INVENTION

The instant invention relates generally to illuminating devices and more specifically it relates to a auxiliary backup side fender light for a motor vehicle.

Numerous illuminating devices have been provided in prior art that are adapted to produce auxiliary lighting for motor vehicles. For example, U.S. Pat. Nos. 3,017,500; 3,287,550 and 3,553,644 all are illustrative of such prior art. While these units may be suitable for the particular purpose to which they address, they would not be as suitable for the purposes of the present invention as heretofore described.

SUMMARY OF THE INVENTION

A primary object of the present invention is to provide an auxiliary backup side fender light for a motor vehicle that will overcome the shortcomings of the prior art devices.

Another object is to provide an auxiliary backup side fender light for a motor vehicle that will help the driver see the curb, sidewalk and other cars at night when parking the motor vehicle.

An additional object is to provide an auxiliary backup side fender light for a motor vehicle that is activated and turned on when the gear shifted lever of the motor vehicle is placed into reverse.

A further object is to provide an auxiliary backup side fender light for a motor vehicle that is simple and easy to use.

A still further object is to provide an auxiliary backup side fender light for a motor vehicle that is economical in cost to manufacture.

Further objects of the invention will appear as the description proceeds, including locating the backup light at various locations.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side view of a motor vehicle showing the invention disposed into side of a fender, underside of the motor vehicle, on the front door, the bumper or other locations.

FIG. 2 is a top view thereof as indicated by arrow 2 in FIG. 1.

FIG. 3 is a top view of the invention.

FIG. 4 is an exploded cross sectional view taken along line 4—4 in FIG. 1.

FIG. 5 is a cross sectional view like FIG. 4 in an assembled position showing a piston arm of a solenoid pushing the movable housing member out therefrom.

FIG. 6 is a cross sectional view similar to FIG. 5 of a modification in which the lamp is located in a different position so that light can be reflected from an adjustable reflective surface in the movable housing member.

FIG. 7 is a block diagram showing the electrical circuitry.

DETAILED DESCRIPTION OF THE PREFERRED EMBODIMENTS

Turning now descriptively to the drawings, in which similar reference characters denote similar elements throughout the several views, FIGS. 1 and 2 illustrate a pair of auxiliary backup side fender lights 10 for a motor vehicle 12. As best shown in FIGS. 3, 4, 5 and 7, each of the lights 10 contain a stationary housing 14 mounted within side of one front fender 16 of the motor vehicle 12. A movable housing 18 is spring biased by using a return spring 20 on slotted shaft 22 to forward end of the stationary housing 14. The movable housing 18 has a reflective chamber 24 and extends into the stationary housing 14. An auxiliary lamp 26 is mounted into the reflective chamber 24 of the movable housing 18. A mechanism 28 is provided for pivoting the movable housing 18 out from the stationary housing 14 so that the auxiliary lamp 26 can be activated to project light beams from the reflective chamber 24 of the movable housing 18 relative to the motor vehicle 12 to help driver (not shown) see at night when parking.

The mechanism 28 includes a solenoid 30 mounted transversely into the stationary housing 14. A recessed portion 32 is disposed in the movable housing 18 so that when the solenoid 30 is activated, movable arm 34 of the solenoid 30 will push against the recessed portion 32 causing the movable housing 18 to pivot out from the stationary housing 14.

FIG. 6 shows a switch 36 electrically connected between the solenoid 30 and the auxiliary lamp 26 and is mechanically connected to a gear shift lever 38 in the motor vehcile 12 so that when the gear shift lever 38 is placed into reverse the switch 36 will close activating the solenoid 30 and the auxiliary lamp 26 from a battery 40 in the motor vehicle 12.

As best seen in FIGS. 4 and 5, the reflective chamber 24 includes a parabolic side wall reflector 42. The auxiliary lamp 26 is mounted in a rear wall 44 so that the auxiliary lamp 26 is activated the light beams will be reflected rearward from the parabolic side wall reflector 42.

As best seen in FIG. 7 another form of the reflective chamber 24 includes a reflective rear wall 46, an adjustable reflective front wall 48 pivotable thereto at 50 and a side wall 52 in which the auxiliary lamp 26 is mounted into. When the auxiliary lamp 26 is activated the light beams will be reflected rearward from both the reflective rear wall 46 and the adjustable reflective front wall 48.

As shown in FIG. 1 in phantom, the lights 10 can also be mounted to the underside 17 of the motor vehicle 12, on the front door 19, the bumper 21 or other locations on the motor vehicle 12. The lights 10 can also be placed into the molding trum, against the step of a van (not shown).

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An auxiliary backup side fender light for a motor vehicle comprising in combination with the motor vehicle;

(a) a stationary housing mounted within side of a front fender of the motor vehicle;
(b) a movable housing spring biased to forward end of said stationary housing so as to extend into said stationary housing said movable housing having a reflective chamber;
(c) an auxiliary lamp mounted into said reflective chamber of said movable housing; and
(d) means for pivoting said movable housing out from said stationary housing so that said auxiliary lamp can be activated to project light beams rearward from said reflective chamber of said movable housing relative to the motor vehicle to help driver see at night when parking, wherein said pivoting means includes:
(e) a solenoid mounted transversely into said stationary housing; and
(f) a recessed portion disposed in said movable housing so that when said solenoid is activated movable arm of said solenoid will push against said recessed portion causing said movable housing to pivot out from said stationary housing further including a switch electrically connected between said solenoid and said auxiliary lamp and is mechanically connected to a gear shift lever in the morot vehicle so that when the gear shift lever is placed into reverse said switch will close activating said solenoid and said auxiliary lamp from a battery in the motor vehicle.

2. An auxiliary backup side fender light as recited in Claim 1, wherein said reflective chamber includes:
(g) a parabolic side wall reflector; and
(h) a rear wall in which said auxiliary lamp is activated the light beams will be reflected rearward from said parabolic side wall reflector.

3. An auxiliary backup side fender light as recited in Claim 1 wherein said chamber includes:
(g) a reflective rear wall;
(h) an adjustable reflective front wall pivotable thereto; and
(i) a side wall in which said auxiliary lamp is activated the light beams will be reflected rearward from both said reflective rear wall and said adjustable reflective front wall.

* * * * *